United States Patent
Kwong et al.

(10) Patent No.: US 10,382,922 B2
(45) Date of Patent: Aug. 13, 2019

(54) DISTRIBUTED TESTING OF WIRELESS NETWORKS

(71) Applicant: T-Mobile USA, Inc., Bellevue, WA (US)

(72) Inventors: Samson Kim-Sun Kwong, Bellevue, WA (US); Peter P. Myron, Renton, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/622,752

(22) Filed: Jun. 14, 2017

(65) Prior Publication Data

US 2018/0367940 A1    Dec. 20, 2018

(51) Int. Cl.
| | |
|---|---|
| H04M 3/00 | (2006.01) |
| H04W 4/60 | (2018.01) |
| H04W 24/08 | (2009.01) |
| H04W 64/00 | (2009.01) |
| H04L 12/26 | (2006.01) |
| H04W 84/04 | (2009.01) |

(52) U.S. Cl.
CPC ............. *H04W 4/60* (2018.02); *H04L 43/062* (2013.01); *H04L 43/0852* (2013.01); *H04L 43/16* (2013.01); *H04W 24/08* (2013.01); *H04W 64/006* (2013.01); *H04L 43/045* (2013.01); *H04L 43/08* (2013.01); *H04W 84/042* (2013.01)

(58) Field of Classification Search
CPC ...................................................... H04W 24/08
See application file for complete search history.

(56) References Cited

U.S. PATENT DOCUMENTS

| | | |
|---|---|---|
| 6,970,924 B1 | 11/2005 | Chu et al. |
| 7,912,967 B2 | 3/2011 | Mace et al. |
| 9,547,584 B2 | 1/2017 | Acharya et al. |
| (Continued) | | |

FOREIGN PATENT DOCUMENTS

WO    WO2014176243    10/2014

OTHER PUBLICATIONS

Office action for U.S. Appl. No. 15/338,069, dated Jan. 22, 2018, Myron, "Remote Access of Cellular Communication Devices for Software Development and Testing", 22 pages.

(Continued)

*Primary Examiner* — Justin Y Lee
(74) *Attorney, Agent, or Firm* — Lee & Hayes, P.C.

(57) ABSTRACT

Testing of a wireless communication network is performed by placing test devices in multiple geographic regions. The test devices may be typical consumer wireless devices, such as smartphones, of types that are used with the wireless communication network. Communication channels are established with the devices from a test controller, through a wide-area network such as the Internet and through USB ports or other wired interfaces of the devices. The test controller provides scripts that measure response times of applications that execute on the devices. The response times are used as indicators of network performance in the geographic regions. When the response time for a particular region exceeds a threshold, an operator may be notified or other automated actions may be initiated to address potential network problems in the region.

20 Claims, 5 Drawing Sheets

(56) References Cited

U.S. PATENT DOCUMENTS

| | | |
|---|---|---|
| 9,703,686 B2 | 7/2017 | dos Santos et al. |
| 2004/0088405 A1 | 5/2004 | Aggarwal |
| 2005/0089028 A1 | 4/2005 | Hopkins |
| 2008/0104575 A1 | 5/2008 | Fan et al. |
| 2008/0126653 A1 | 5/2008 | King et al. |
| 2008/0139195 A1* | 6/2008 | Marsyla ............... H04W 24/10 455/423 |
| 2010/0274850 A1 | 10/2010 | Mace et al. |
| 2011/0219111 A1 | 9/2011 | Shevenell |
| 2012/0009918 A1* | 1/2012 | Wu ....................... H04W 24/10 455/423 |
| 2013/0267179 A1 | 10/2013 | Parekh et al. |
| 2014/0160941 A1 | 6/2014 | Hui et al. |
| 2014/0189641 A1 | 7/2014 | Anderson et al. |
| 2015/0082283 A1 | 3/2015 | Smith et al. |
| 2015/0201045 A1 | 7/2015 | Komirelly et al. |
| 2015/0220426 A1 | 8/2015 | Spektor et al. |
| 2016/0232079 A1 | 8/2016 | dos Santos et al. |
| 2017/0339630 A1* | 11/2017 | Ketonen ............... H04W 48/16 |
| 2017/0366983 A1 | 12/2017 | Gunasekara et al. |
| 2018/0124150 A1 | 5/2018 | Myron et al. |
| 2018/0365133 A1 | 12/2018 | Mitchell et al. |
| 2018/0368010 A1 | 12/2018 | Mitchell et al. |

OTHER PUBLICATIONS

PCT Search Report and Written Opinion dated Jan. 29, 2018 for PCT Application No. PCT/US17/56796, 13 pages.

Office Action for U.S. Appl. No. 15/338,069, dated May 4, 2018, Myron, "Remote Access of Cellular Communication Devices for Software Development and Testing", 27 pages.

Office Action for U.S. Appl. No. 15/622,697, dated Jul. 5, 2018, Mitchell, "Continuous Integration Testing for Network-Based Applications", 18 pages.

PCT Search Report and Written Opinion dated Sep. 18, 2018 for PCT Application No. PCT/US18/34937, 13 pages.

Office Action for U.S. Appl. No. 15/622,807, dated Oct. 25, 2018, Mitchell et al, "Device-Based Diagnostic Network Testing", 10 pages.

Office Action for U.S. Appl. No. 15/622,697, dated Feb. 8, 2019, Mitchell et al, "Continuous Integration Testing for Network-Based Applications", 19 pages.

* cited by examiner

DISTRIBUTED TESTING OF WIRELESS NETWORKS

BACKGROUND

Mobile communication devices such as smartphones, tablet computers, wearable devices, etc. are widely used by consumers for many things other than voice communications. Specifically, these devices are designed so that consumers can install various applications, which may perform many different tasks. For example, various applications may be used for things such as shopping lists, text messaging, social network communications and sharing, research, weather reporting, news, and so forth.

Applications such as this often rely on interactions with remote servers or data stores, and may further rely on wireless data connectivity to communicate with such remote servers or data stores. For example, a weather application may communicate with a remote server in order to obtain weather information. Similarly, a list application may store lists on a remote server or database so that the lists can also be accessed on multiple devices.

In many situations, data connectivity is available to mobile devices through cellular communications networks, which are provided by cellular communication providers. Cellular communication providers maintain large infrastructures for providing wireless data communications for mobile devices. A cellular services infrastructure includes geographically distributed base stations as well as centralized communication services. In addition, many cellular communication providers also provide various consumer applications for installation and use on the mobile devices of their customers. For example, a cellular communication provider may provide an application that allows customers to manage their cellular service accounts. Customers may also obtain, install, and use many other applications, many of which may rely on the availability of cellular data communications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods to determine wireless network conditions as they exist in different geographic regions. The devices, systems and methods may also be used to determine operability and/or performance of device applications in different geographic regions.

In a described embodiment, a central test controller monitors wireless devices located in different geographic regions such as different cities, different states, different countries, and at different locations within cities, states, or countries. The wireless devices may be the same brands and models that are sold to consumers, and may include smartphones, tablet computers, wearable computers, hotspots, and other devices, including both mobile and stationary devices, that have cellular or other wireless communication capabilities.

In a described embodiment, each wireless device is connected through its USB port to the Internet, for communications with the test controller. The test controller communicates with the wireless devices and accesses debug interfaces of the devices to perform testing. In certain embodiments, tests may involve commanding each wireless device to execute an application. The application is selected as one that relies, for at least a portion of its functionality, on communicating through a cellular communication network or other wireless communication network. The application may be a consumer application that is also commercially available to users for installation and use on their personal wireless devices.

After the application is initiated on the wireless devices, the test controller continues to communicate through the debug interfaces of the devices in order to obtain parameters relating to execution of the application on the devices. For example, the test controller may determine, for each wireless device, the time for the application to load and be ready for user input or to perform a particular function. The time to load for certain applications is dependent on operational status of the cellular communication network, such as whether the communication network is available, whether operation of the communication network is impaired, the current speed of the communication network, the currently latency of communications using the communication network, and so forth. As another example, the test controller may send commands to simulate user input on the wireless devices, instructing the application on each wireless device to perform a function that relies on operational status such as cellular communication network availability, latency, and/or speed, and may measure the time it takes the application to perform that function on each of the mobile devices.

Test results may be recorded over time and may be used to indicate operational status of the cellular communication network in the different geographic regions. For example, response times of an application on mobile devices in different regions may be obtained and recorded over time. If the response time for a particular device in a particular geographic region exceeds a threshold, a notification may be automatically generated and sent to service technicians or other personnel that are responsible for infrastructure in that geographic region. The notification may alert the technicians or other personnel that trouble has been detected in the geographic region, describe the nature of the test that was used to detect the trouble, and/or provide instructions for repairing the detected degradation. Notifications may be sent using email, text messaging, group messaging applications, and so forth.

In some cases, test results such as response times may be compiled for different regions and graphically presented on a display console, forming a status dashboard that allows personnel of the cellular communication network provider to visually monitor network conditions across a country or around the world. Test results may, for example, be presented as graphs, bar charts, or heat maps, that illustrate response times or other performance metrics over time. Such a visual representation may make it easy for a technician to monitor conditions and to spot localized service impairments.

This device based and geographically distributed network monitoring may be performed in addition to other network monitoring techniques that may rely on data received from infrastructure components and services of the cellular communication network. Evaluating network status using widely used consumer devices, placed in different locations, simulates experiences of real users in these locations, and is therefore a relatively reliable way to determine actual network status. In some cases, this type of network monitoring may detect network outages and performance issues before they are detected by infrastructure components. Also, in some cases this type of network monitoring may detect problems that would otherwise only be identified upon receiving customer complaints.

Logged historical status data may also aid troubleshooting. When a performance issue arises, for example, logs may be consulted to determine whether the issue is limited to one or more specific geographic regions or whether the issue is system wide. Similarly, such logs may also reveal the geographic region where the issue first arose, and may indicate whether the issue spread geographically or remained local to the region or regions in which is first arose.

Figure 1:
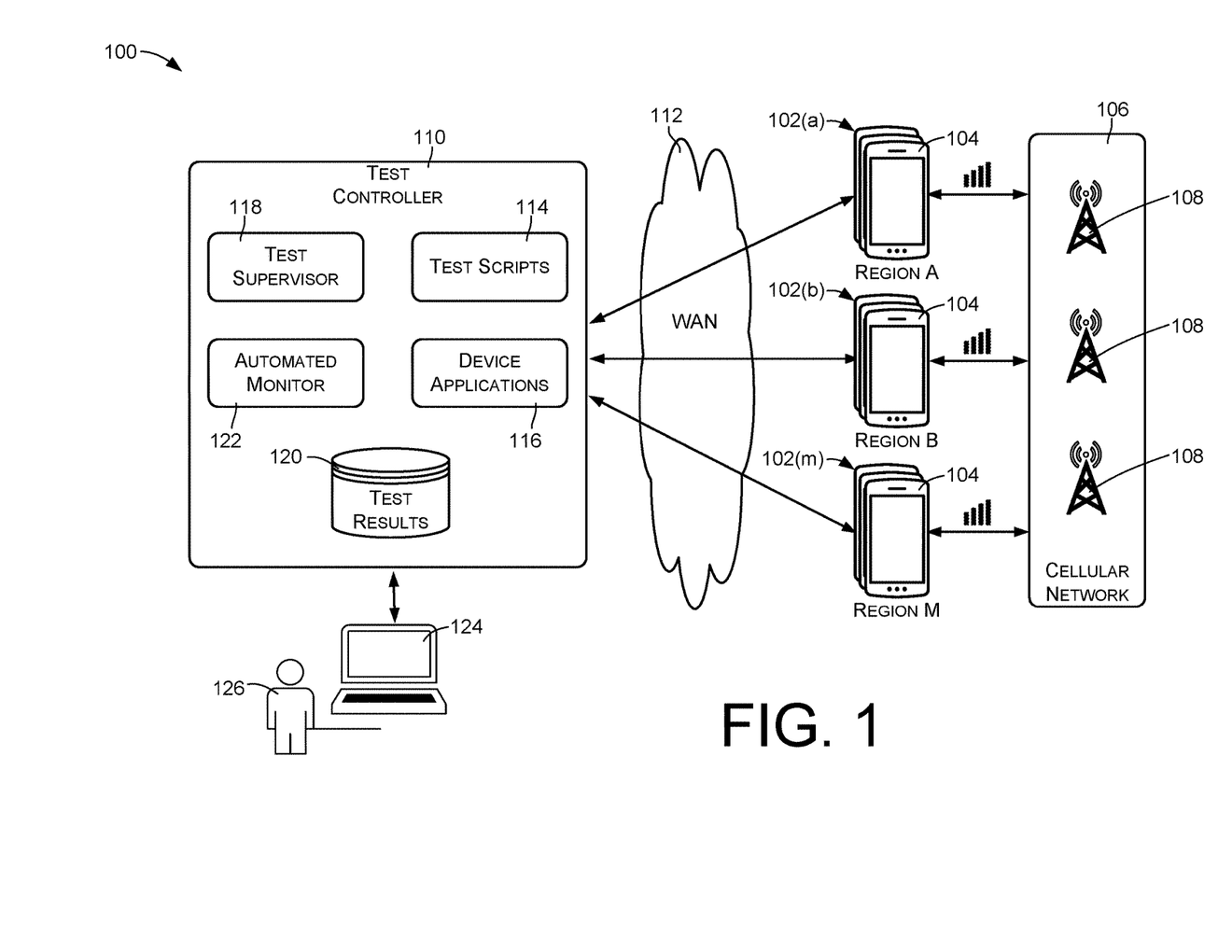
FIG. 1 is a block diagram of an example configuration that enables geographically distributed performance testing of a cellular communication network.

FIG. 1 illustrates an example configuration 100 for obtaining metrics that relate to performance or other operational status of a cellular or other wireless communication network. The configuration 100 uses geographically distributed banks of consumer devices, such as models of mobile devices commonly used by users of the wireless communication network, to detect various types of network conditions that may exist in each of many different geographic regions. For example, the configuration 100 may allow detection of operational status regarding network congestion, network failures, performance issues such as latency or speed issues, application server availability issues, and other issues that may be related to network infrastructure and services, and that may vary from region to region. The configuration 100 may also allow detection of device compatibility issues that in some cases may be specific to a geographic region. The configuration 100 allows testing to be performed in a manner that replicates the experiences of actual device users in different geographic areas.

The configuration 100 includes multiple device banks 102 located in respective geographic regions. For purposes of discussion, FIG. 1 shows device banks 102(a) through 102(m), which may comprise any number of device banks 102 in any number of regions A through M.

Each device bank 102 comprises one or more wireless communication devices 104, which may be referred to in the following discussion as test devices 104. The test devices 104 are provisioned to operate as part of a cellular communication network 106. For example, the test devices 104 may have SIMs (Subscriber Identity Modules) that have been registered with the cellular communications provider for use on the cellular communication network 106. Accordingly, the test devices 104 can communicate using wireless cellular communication signals with and over the cellular communication network 106. The cellular communication network 106 may in turn allow the test devices 104 to communicate with and through wide-area networks such as the Internet.

The cellular communication network 106 supports traditional cellular services such as voice calls and text messaging. In addition, the cellular communication network 106 may support various IMS (IP Multimedia Subsystem) services, such as audio, video, messaging, conferencing, location sharing, and so forth. In certain implementations, the cellular communication network 106 may comprise a GSM (global system for mobile communications) network.

The cellular communication network 106 shown in FIG. 1 comprises a communication infrastructure that in many cases may be distributed over a large region, such as an entire country or a portion of a country. For example, the cellular communication network 106 may have many different wireless base stations or other access points 108, which in FIG. 1 are illustrated as communication towers. More generally, the cellular communication network 106 may include regional elements such as base stations, network hubs, server farms, application servers, etc. In some cases, the regional elements may also include Wi-Fi hotspots, microcells, and/or other elements that allow devices to communicate with the network 106.

The test devices 104 may include any types of devices that are configured for use in conjunction with the cellular communication network 106, including smartphones, tablet computers, laptop computers, wearable devices, control devices, automation devices, etc. Furthermore, the test devices 104 may comprise consumer devices of brands and models that are sold, leased, or otherwise provided for use on the cellular communication network 106. Such test devices may include models that are currently available to consumers, models that are in development for future release to consumers, and "legacy" models that are no longer manufactured, produced, or sold, but which may still be in use by consumers. In some cases, the test devices 104 of each bank 102 may include devices of different types, models, or configurations, and may be generally representative of devices that are in use on the cellular communication network.

The configuration 100 has a test controller 110 that communicates with the test devices 104 using one or more data communications channels that do not rely upon the cellular communication network 106. As an example, the test controller 110 may communicate through a wide-area network (WAN) 112 with the test devices 104. The wide-area network 112 may comprise or include the Internet. Alternatively, the wide-area network 112 may comprise a private data communication network maintained on or on behalf of the provider of the cellular communication network 106.

The devices 104 are also connected for communications through the wide-area network 112, using communication capabilities and interfaces other than the cellular communication interfaces of the devices 104. As will be described with reference to FIG. 2, the test devices 104 may communicate over the wide-area network 112 using interface devices that connect to wired USB ports of the devices 104. In other embodiments, one or more of the test devices 104 might have an integrated network communication interface, such as a Wi-Fi or Ethernet interface, for communications through the wide-area network 112.

The test controller 110 is configured to perform testing of the test devices 104 to determine one or more metrics relating to the cellular communication network 106 in the different regions in which the device banks 102 are located. The testing may in some cases also reveal application-specific issues that are specific to a particular area.

To perform such testing, the test controller 110 sends commands and receives data through instrumentation interfaces of the test device 104. The instrumentation interfaces, also referred to as debug interfaces, accept commands that control configuration and operation of the devices 104. Commands can also simulate user input. Commands can similarly request data indicating responses and other output of applications that execute on the test devices, including output and status of user interfaces. Commands can also request information regarding states, conditions, and configurations of the test devices, regarding resources, and regarding the applications that are executing on the test devices.

In the described embodiment, at least some of the test devices 104 operate using any one of several variants of the Android operating system, including variants intended for phones, tablets, wearable devices, laptop computers, controllers and automation devices, etc., and including variants intended for devices of multiple manufacturers. As an example of a debug interface, the Android operating system supports a logical interface, accessible through a wired USB port of a device, that can be used for debugging and development. The interface, referred to as Android Debug Bridge or ADB interface, allows use of a command/query language and syntax to interact with Android-based devices, allowing control of the devices for development and testing. ADB also includes a communication stack that facilitates communications between an external device (in this case the test controller 110) and a device that is running the Android operating system (in this case a test device 104).

The test devices 104 may also include devices using other operating systems, which may have their own respective types or variants of debug interfaces.

The test controller 110 may in some embodiments have test scripts 114, each of which can be executed against any of the test devices 104. Each test script 114 specifies a sequence of operations to be performed with respect to a test device 104. Operations may include loading and initiating applications, simulating user input, receiving or detecting user interface output, evaluating system resources or other resources being used by the device or an application executing on the device, and so forth.

The test scripts 114 may include or define tests that depend upon capabilities and performance of the cellular communication network 106. For example, a test may monitor the performance of an application running on the test devices 104. As more specific example, a test may comprise initiating an application on a device 104, where the application is one that uses data from a remote server, and where the remote server is accessed by the application via the cellular communication network 106. The test may measure response times of the application, such as the time for the application to load and be ready for user input or the time to respond to a simulated user command.

The test controller 110 may store or have access to one or more device applications 116 that can be installed on the test devices 104. In some cases, the device applications 116 may include applications that are available for consumer use, such as applications that can be obtained from Internet-based application stores or markets, and which are not designed to measure cellular communication network status or performance. However, the applications 116 can be selected as ones that exhibit one or more response times that depend upon performance of the cellular communication network 106, such as its availability, latency, and/or speed.

In some embodiments, the test controller 110 may also have a test supervisor 118. The test supervisor 118 may comprise, for example, a program or application that initiates and/or runs the test scripts 114 in accordance with a schedule and/or in accordance with input from an operator. In one embodiment, the test supervisor 118 is configured to periodically perform one or more tests of each of the test devices 104.

Note that in some cases, the device applications 116 may be downloaded and installed from a content provider or from an Internet-based or other network-based application storefront or market, rather than provided by the test controller 110. That is, a test script 114 may include commands that cause the devices 104 to download or otherwise obtain such applications and to install the applications.

The test supervisor 118 may be configured to store test results 120. In the context of the example discussed above, the test results 120 may include a history of response times for each of the devices 104.

In some embodiments, the test controller 110 may have an automated monitor 122 that monitors and analyzes the test results 120 to detect impairments in network operations in geographic regions of the cellular communication network 106. As one example, the automated monitor 122 may compare logged response times to a threshold. If the response time in a particular geographic area exceeds the threshold, the automated monitor 122 may alert appropriate service personnel, and/or may initiate automated actions to restore the response time to a desired range of values.

In some embodiments, the configuration 100 may include a console 124 upon which a human operator 126 can view the test results 120 as they are generated. The test results 120 can be presented in various ways, such as using graphs or charts that show response time histories in each of multiple geographic regions. The console 124 may also show alerts that are generated by the automated monitor 122 regarding outages or other network impairments.

Figure 2:
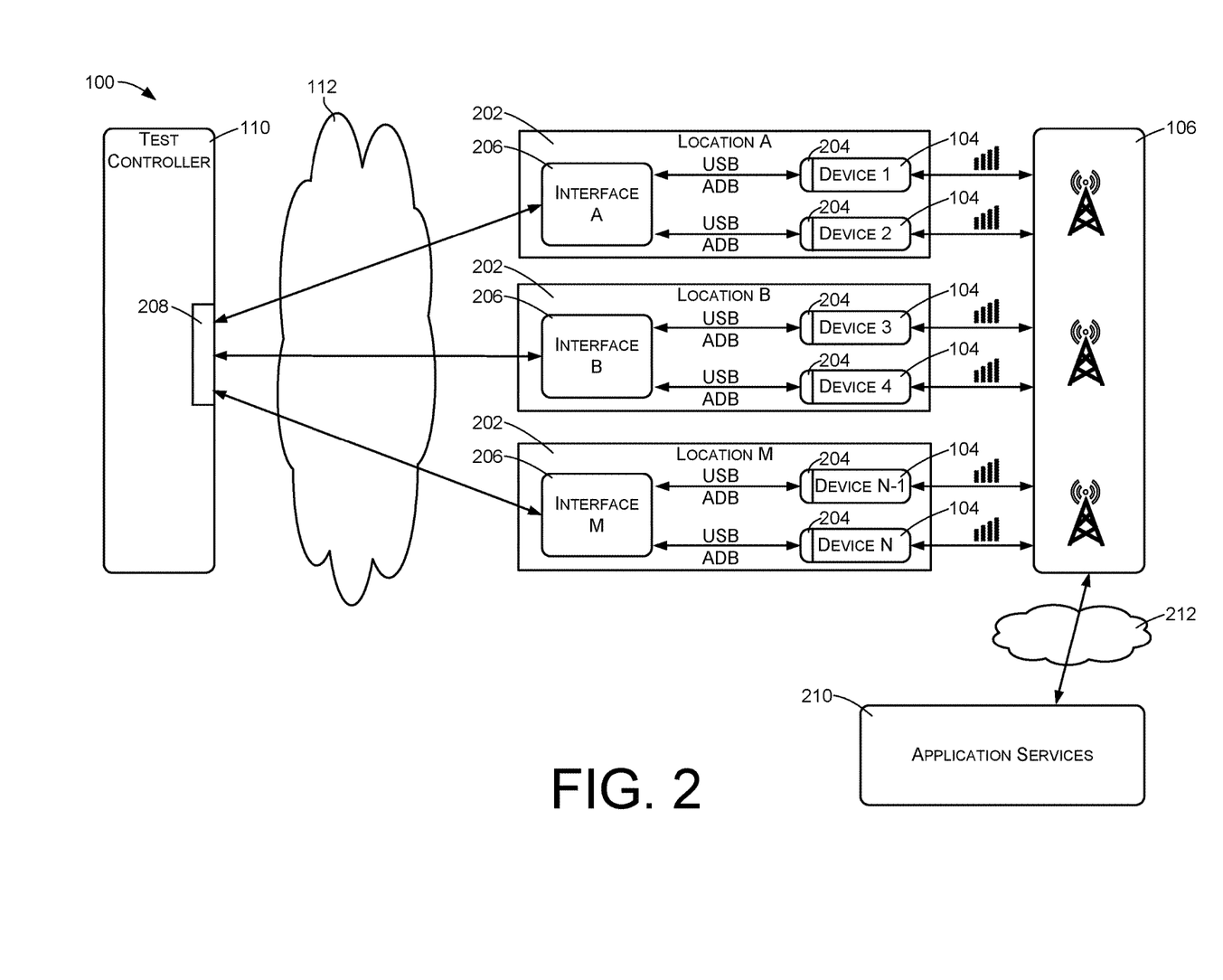
FIG. 2 is a block diagram showing further details of the example configuration shown in FIG. 1.

FIG. 2 illustrates further details of the configuration 100 in an example implementation. In particular, FIG. 2 illustrates details regarding how communications are implemented between the test controller 110 and the test devices 104.

A device cluster 202 is located within each of multiple geographic regions. As an example, a cellular services provider may put a device cluster in multiple retail locations, service/support locations, etc.

Each device cluster 202 has one or more devices 104. In some embodiments, each device cluster 202 may have an identical mix of device brands, models, types, and/or configurations. In other environments, different locations may have device clusters that have respectively different combinations of brands, models, types, or configurations of devices.

Each test device 104 of a cluster 202 has a wired communication port 204 such as a USB (Universal Serial Bus) port. In addition, each test device 104 implements a logical control interface that can be accessed through the USB port for interacting with and controlling the test device 104. In certain embodiments, the logical control interface may comprise an ADB (Android Debug Bridge) interface. In other embodiments, logical control interfaces may support remote debugging connections and protocols other than ADB.

Within each device cluster 202, each test device 104 is connected by a wired USB connection to an interface device 206. Each interface device 206 may comprise a relatively inexpensive diskless, single-board computer or controller having an Ethernet network port and one or more other wired communication ports such as USB (Universal Serial Bus) device ports. Each interface device 206 may be configured and programmed by way of a code image that is stored on a removable memory card. For example, an interface device 206 may have a slot into which a removable SD memory card is inserted, and the code image for the interface device 206 may be stored on the SD memory card. The interface device 206 may be easily reconfigured by changing its memory card. Each device cluster 202 may include one or multiple interface devices 206, and each interface device 206 may support any number of test devices 104.

In the example shown by FIG. 2, each interface device 206 is connected to a corresponding test device 104 through the wired communication port 204 of the test device 104. Specifically, each interface device 206 is connected by USB cables to the USB communication ports 204 of two test devices 104, using respective USB communication ports (not shown) of the interface device 206.

The test controller 110 has a network interface or adapter 208, such as an Ethernet adapter or Wi-Fi interface, that enables communications through the wide-area network 112. Each interface device 206 similarly has a network interface (not shown), such as an Ethernet adapter or Wi-Fi interface, that is connected to enable communications through the wide-area network 112. As mentioned, the wide-area network may comprise or include the Internet in some embodiments.

The test controller 110 is configured to communicate through its network interfaces 210 and the wide-area network 112 with the respective interface devices 206. Each interface device may be configured to automatically establish a VPN (Virtual Private Network) communication channel with the test controller 110, and within the resulting virtual network to establish a TCP (Transport Control Protocol) connection with the test controller 110. ADB communications can then be conveyed between the test controller 110 and the interface devices 206 over TCP connections between the test controller 110 and the interface devices 206. An interface device 206 at a particular location is configured to relay ADB communications between the test controller 110 and the test devices 104 at that location. This results in an end-to-end communication channel between the test controller 110 and each of the devices 104. Each channel extends from the test controller 110 to one of the test devices 104 via one of the interface devices 206 and the USB port 204 of the test device 104.

In some cases, application services 208 may be provided by the cellular communication network provider and/or by other parties to perform services for an application that is used on cellular communication devices. Such an application may communicate with the application services 208 through the cellular communication network 106, and may therefore depend at least some aspects on the operational status of the cellular communication network 106. In some environments, for example, the application services 208 may be implemented by a network-based server that is accessed through the Internet. In this situation, the application may utilize the connectivity of the test device 104 with the cellular communication network 106 to communicate with the application services 208 through a wide-area network 212, which may again comprise or include the Internet.

In some embodiments, the interface devices 206 may be configured to execute the test scripts 114 of FIG. 1. In these embodiments, the test controller 110 may send a test script 114 to each of the interface devices 206. Upon receiving a test script 114, the interface device 206 executes the operations specified by the test script 114, obtains resulting data, and sends the data back to the test controller 110.

Although various elements of FIGS. 1 and 2 are shown and described as being discrete devices or components for purposes of discussion, any of the illustrated computing elements may in practice comprise one or more physical, virtual, or otherwise abstracted cluster or network of machines and/or devices. For example, although the test controller 110 is described as a single entity, the term "test controller" is intended to reference any one or more computing devices, including physical devices and virtual computing units, and including network-based devices that are commonly referred to as being in the cloud.

Figure 3:
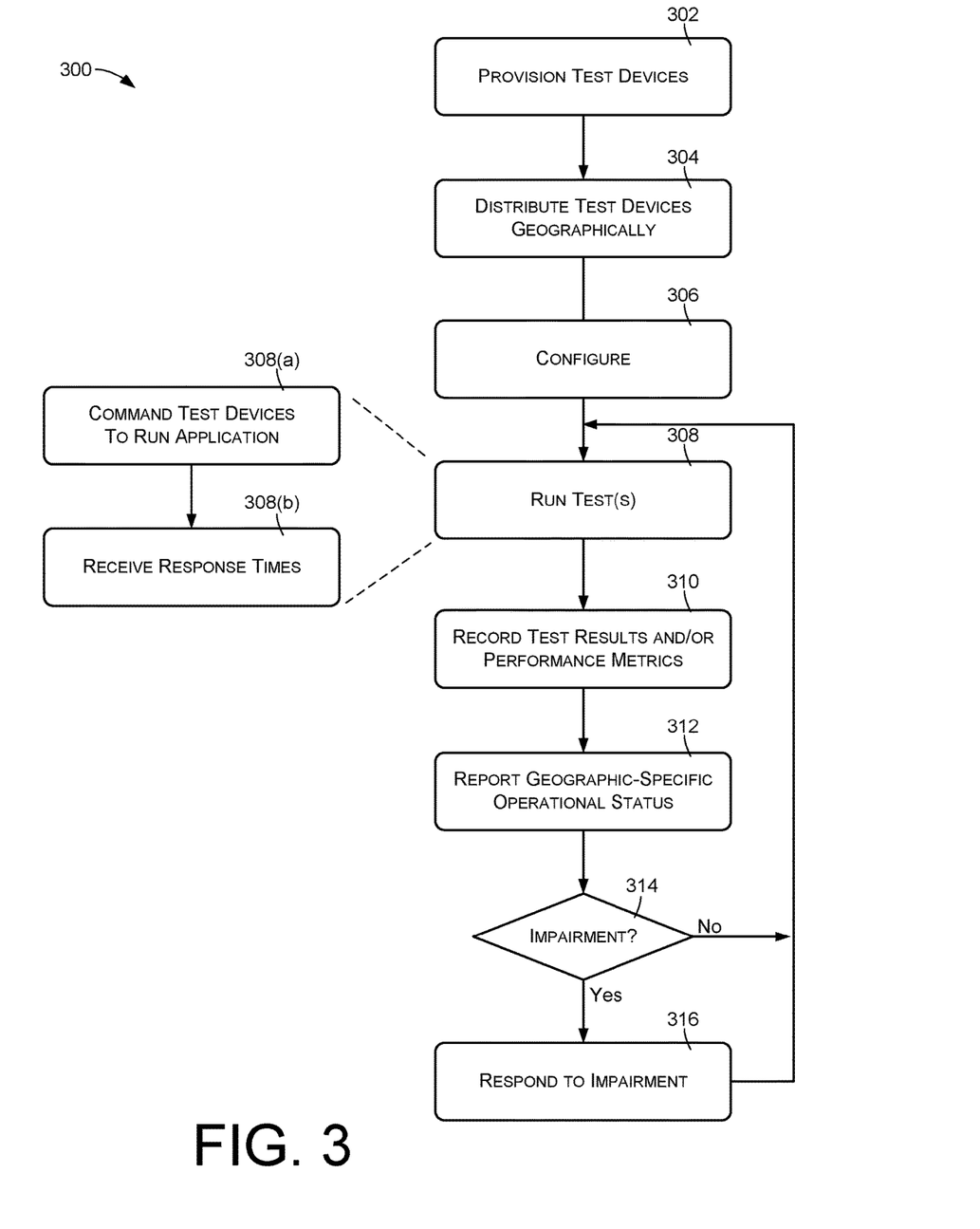
FIG. 3 is a flow diagram illustrating an example method of distributed performance testing of a wireless communication network.

FIG. 3 illustrates an example method 300 for monitoring operational status of a cellular communications network at multiple locations. The example method 300 may be performed in the environment described above with respect to FIGS. 1 and 2, and some of the described actions may be performed by the test controller 110 and/or the interface devices 206. The method 300 may also be performed in other environments, and at least some of the actions of the method 300 may be performed by any combination of one or more computers and/or other components.

An action 302 comprises provisioning multiple test devices for communicating as part of a communication network, such as a cellular communication network that has been designed to support various types of wireless communication devices. The test devices may comprise devices of one or more models or types that might be used in conjunction with the cellular communication network and that are configured to communicate with the cellular communication network, such as devices that have been or will be commercially available to users of the cellular communication network.

In addition to cellular communication capabilities, the test devices may also have non-cellular communication interfaces. For example, the test devices may have wired communication ports such as USB ports. In addition, the test devices may support logical control interfaces at the wired communication ports. For example, a particular device may have a physical USB communication port and may also implement a logical control interface via the USB communication port. In certain environments, the logical control interface may comprise an ADB interface.

An action 304 comprises distributing the test devices geographically. For example, at least one test device may be located in each of multiple different regions, such as different stores, different support centers, different cities, different states, etc. In some cases, a cluster of multiple test devices is located in each region. Generally, the test devices may be distributed geographically in locations that are within the coverage area of a cellular communications network.

An action 306 comprises configuring a test controller, which may include configuring the test controller for communicating with the test devices. The test controller may be a computer or a bank of computers that are located geographically at a different location than at least some of the test devices. The test controller may be configured to communicate with the test devices over a wide-area network such as the Internet. In some embodiments, communications may use TCP-based ADB communication channels that correspond respectively to the test devices. In some cases, communications may be facilitated by interface devices at each location as described above, so that communications with the test devices are through the wired USB ports of the test devices. Generally, communications between the test controller and the test devices do not utilize or rely upon cellular communications capabilities of the test devices, and can therefore be performed independently of any cellular communication network.

The action 306 may in some cases include receiving metadata from each test device, such as the make and model of the device, the configuration of the device, the temperature of the device, the cellular signal strength as measured by the device, the cell tower or base station to which the device is attached, and so forth. In some cases, the metadata may include or may indicate the locations of the test devices. For example, each device may use its GPS (Global Positioning System) capabilities to determine its position, and may report its geographical coordinates as metadata.

An action 308, which may be performed by the test controller and/or the interface devices 206, comprises performing, or causing to be performed, a test or a set of tests on one or more of the test devices in the different geographic regions. The action 308 may comprise communicating with the test devices using a wide-area network, via wired or other non-cellular interfaces of the test devices, to initiate and monitor various types of tests that may be relevant to performance or operational status of the cellular communication network.

Actions 308(a) and 308(b) are shown in FIG. 3 as an example of the action 308. The action 308(a) comprises commanding the test devices to execute an application that relies at least in part on communicating through the cellular communication network. As discussed above, commands can be sent from the test controller to the test devices using respective communication channels, where the communication channels are established through a wide-area network such as the Internet and via wired USB ports or other non-cellular ports of the test devices.

The application may be a consumer application, such as an application that is available for installation and/or provided for use by consumers on consumer-owned devices. The application may also be such that it relies for its optimal operation at least in part on communications through the cellular communication network. In some cases, the action 308(a) may include commanding the test devices to download the application prior to executing the application. For example, a test device may be given various commands that cause it to download the application from an online repository such as an online storefront or library, to install the application, and to execute the application.

The action 308(b) may comprise subsequently monitoring the application on each of the test devices and receiving data from each of the devices via the communication channels mentioned above. Received data may include data corresponding respectively to each of the test devices, and may indicate various metrics or other information regarding the execution of the application on the respective test devices. As one example, the data may comprise or may indicate one or more response times of the application. Such a response time may comprise the time from launching the application until the first user interface control is available from the application for user input.

An action 310, which may in some cases be performed by the test controller using data determined or received in the action 308, comprises recording received test result data over time, for each of the test devices. The recorded data may include various metrics, which may include response times of the application. Generally, the recorded data may include any data and/or metadata relating to or resulting from execution of the application on the test devices.

An action 312 comprises reporting operational status of the cellular communication network in the different geographic regions, based in part on the received and/or recorded data. The operational status may include information such as network availability, performance parameters, whether there is a network impairment, and so forth. Performance parameters may indicate data transfer speeds, communication latencies, etc.

In some cases, the received data may comprise performance metrics of the application, reflecting performance of the application as it executes on devices in different geographic regions. In some cases the operational status may be based in part on metrics that are be derived from the received data. In some cases, the action 308 may comprise analyzing received data to determine metrics relating to execution of the application on the different test devices, such as various response times of the application.

The reporting can be performed in many ways, such as by displaying metrics, displaying graphics that indicate the metrics, issuing notifications or alarms, sending messages, etc. In some embodiments, as shown in FIG. 1, performance metrics or other metrics relating to operational status may be presented on a console in real time or near real time, for viewing by an operator, technician, or any other personnel. In some cases, information may be presented as charts, graphs, or heat maps, showing performance data for different regions over time. In some cases, the action 312 may comprise reporting that the cellular communication network is impaired in a particular one of the geographic regions, based on an analysis of the performance metrics and/or other received data.

Figure 4:
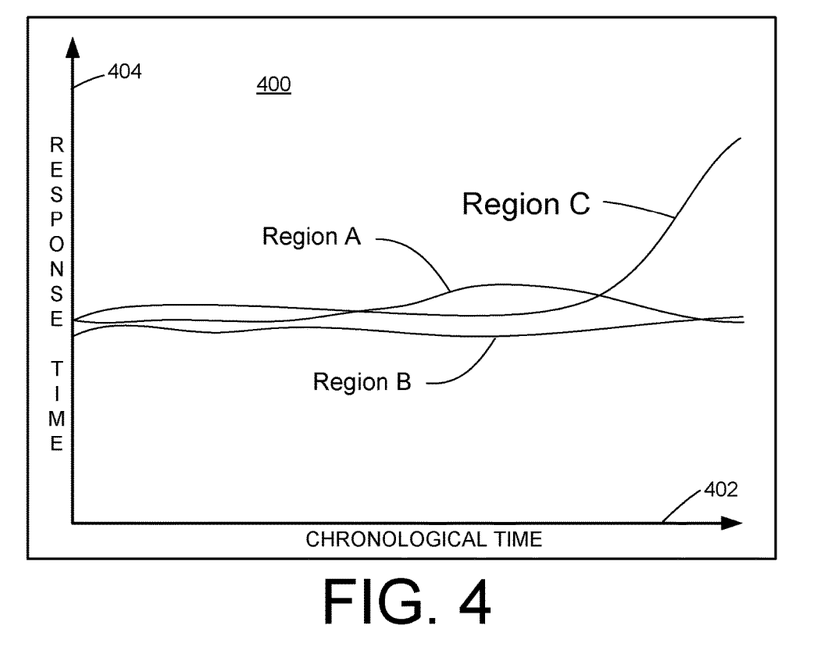
FIG. 4 is a representation of a graphical display pane, illustrating an example of reporting performance metrics of a wireless communication network.

FIG. 4 shows an example display pane 400 such as might be used to display a performance metric for three regions, which are called Region A, Region B, and Region C in FIG. 4. In this example, a single performance metric, in this case a response time, is illustrated over time for the three regions. Specifically, the pane 400 includes a graph having a horizontal axis 402 corresponding to elapsed time and a vertical axis 404 corresponding to application response time. Three curves are shown, corresponding to the three regions. At the right of the graph, the curves indicate the last obtained response time values.

In the example of FIG. 4, it can be easily seen that in the past, the test devices of the three regions exhibited similar response times, with small variations. Toward the right, however, it can be observed that the measured response times for Region C have recently increased to values significantly above those of Regions A and B. Upon noticing this, an operator might perform further investigation and/or might contact appropriate personnel to look into the issue. Different types of graphs or graphics may include various other or additional information, such as threshold lines. Controls may also be available to enable pivots on certain attributes such as device type, operating system, application version, and so forth.

A display console might display several graphs such as shown in FIG. 4, corresponding to different performance metrics and/or different response times. In addition, the console might display alarms or notifications regarding any metrics that are outside normal tolerances.

The pane 400 is just one example of many different ways in which data resulting from the testing described above might be displayed to an operator.

Returning to FIG. 3, an action 314 comprises analyzing the performance metrics or other data that has been obtained and/or stored to determine whether there has been a change in operational status of the communication network in any of the geographic regions, such as a decrease in performance or any other impairment in the operation of the cellular communication network. As a simple example, the action 314 may comprise comparing a response time from each of the regions to a threshold. If the response time of a specific region is above the threshold, the action 314 concludes that there is an impairment in that region. In some embodiments, the automated monitor 122 may perform the action 314.

If no impairment is detected, the method 300 is repeated starting at the action 308. Accordingly, the method 300 results in tests being performed and results displayed repeatedly over time.

If an impairment is detected in the action 314, an action 316 is performed of responding to the impairment. A response might comprise reporting the impairment, such as by sending a notification to appropriate parties, indicating the geographic region in which the impairment has been detected. The action 316 may similarly comprise displaying a message or alert on a console, initiating automated remedial steps, initiating further and/or different types of testing, etc. Color coding may also be used to indicate impairments. For example, a graph or message may be displayed in red when it indicates an impairment.

After the action 316, the method 300 then returns to the action 308 to repeat the actions of testing and reporting. That is, testing continues after initial detection of an impairment in order to detect any further changes such as correction of the impairment.

Figure 5:
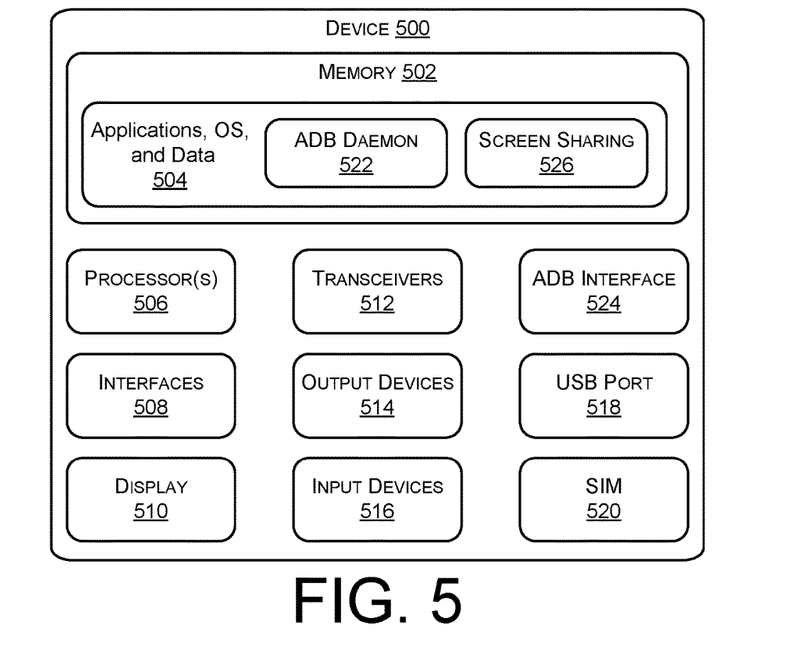
FIG. 5 is a block diagram illustrating example high-level components of a test device such as shown in FIGS. 1 and 2.

FIG. 5 illustrates an example communication device 500 in accordance with various embodiments. The device 500 is illustrative of a test device 104.

The device 500 may include memory 502, which may store applications, an operating system (OS), and data 504. The device 500 further includes processor(s) 506, interfaces 508, a display 510, radio transceivers 512, output devices 514, and input devices 516.

In various embodiments, the memory 502 comprises one or more machine-readable media, which may in turn include volatile and/or non-volatile memory. The memory 502 can also be described as non-transitory computer storage media and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 500.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. The interfaces 508 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 510 may comprise a liquid crystal display or any other type of display commonly used in telecommunication devices or other portable devices. For example, the display 510 may be a touch-sensitive display screen, which may also act as an input device or keypad, such as for providing a soft-key keyboard, navigation buttons, or the like.

In some embodiments, the transceivers 512 include any sort of transceivers known in the art. For example, the transceivers 512 may include radio, radios, and/or radio transceivers and interfaces that perform the function of transmitting and receiving radio frequency communications via an antenna, through a cellular communication network of a wireless data provider. The radio interfaces facilitate wireless connectivity between the device 500 and various cell towers, base stations and/or access points.

In some embodiments, the output device 514 include any sort of output devices known in the art, such as a display (already described as display 510), speakers, a vibrating mechanism, or a tactile feedback mechanism. The output devices 514 also include ports for one or more peripheral devices, such as headphones, peripheral speakers, or a peripheral display.

In various embodiments, the input devices 516 include any sort of input devices known in the art. For example, the input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 500 may have a USB (universal serial bus) port 518 that provides communications with peripheral devices, and which in the embodiment of FIG. 2 connects to one of the interface devices 206. The USB port 518 may also in some cases serve as a battery charging port.

The device 500 may have a SIM (subscriber identity module) 520, which is a removable smart card used to identify a user of the device 500 to the cellular communication network 106.

In some embodiments, the Applications, OS, and data 504 may include an ADB daemon 522, which is an application that runs as a background process to respond to ADB commands. The ADB daemon 522 creates and communicates through an ADB interface 524, which is accessible through the USB port 518.

Figure 6:
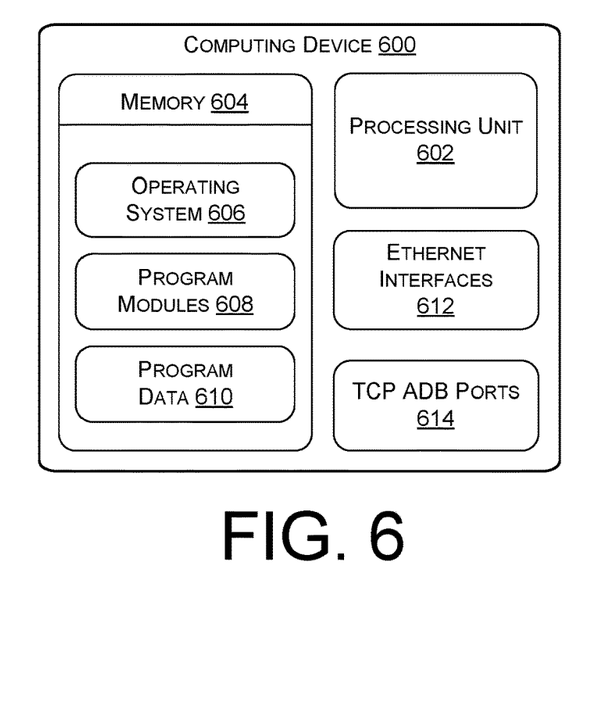
FIG. 6 is a block diagram illustrating example high-level components of a computing device, one or more of which may be used as a test controller in the environment of FIGS. 1 and 2.

FIG. 6 is a block diagram of an illustrative computing device 600 such as may be used to implement the test controller 110. In various embodiments, the computing device 600 may include at least one processing unit 602 and memory 604. Depending on the exact configuration and type of computing device, the system memory 604 may be volatile (such as RAM), non-volatile (such as ROM, flash memory, etc.) or some combination of the two. The memory 604 may include an operating system 606, one or more program modules 608, and may include program data 610. The memory may also include data storage devices (removable and/or non-removable) such as, for example, magnetic disks, optical disks, or tape.

The memory 604 may comprise non-transitory computer storage media. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600.

In various embodiment, any or all of the memory 604 may store programming instructions which, when executed, implement some or all of the function functionality described above as being implemented by the test controller 110.

The computing device 600 may have one or more Ethernet interfaces 612, which may be used for connecting to a wide-area network such as the Internet. The computing device 600 may create and expose multiple TCP-based ADB ports 614 for communications with external devices such as the interface devices 206.

The computing device 600 may have various other elements such as a keyboard, a mouse, a touch-sensitive display, voice input device, etc. Output device(s) such as a display, speakers, a printer, etc. may also be included.

Figure 7:
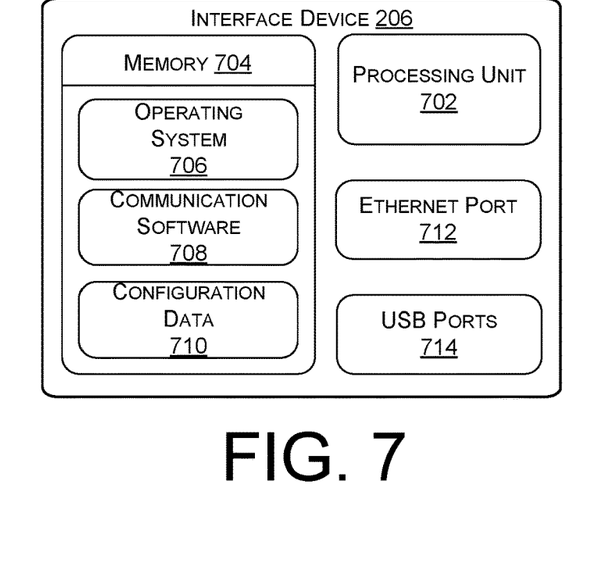
FIG. 7 is a block diagram illustrating example high-level components of an interface device such as shown in FIG. 2.

FIG. 7 illustrates an example implementation of an interface device 206, and shows basic, high-level components of such as device. The components may include at least one processing unit 702 and associated memory 704. In the described embodiment, the memory includes a removable, non-volatile memory card such as may be implemented using flash memory technologies. Such a removable memory card may be used to store a code image in order to configure operation of the interface device 206.

Generally, the memory 704 comprises non-transitory computer storage media of various types. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology.

In various embodiment, any or all of the memory 704 may store programming instructions which, when executed by the processing unit 702, implement some or all of the function functionality described above as being implemented by the interface device 206.

More specifically, the memory 704 may include an operating system 706 and various other software. As a specific example, FIG. 7 shows communication software 708 such as may be used to communicate with the test controller 110 and the test devices 104. The memory 704 may also contain various types of configuration data 710.

The interface device 206 may have an Ethernet interface 712 for communications with the test controller 110 over a wide-area network such as the Internet. The interface device 206 may have multiple USB ports 714 for communication with the test devices 104.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
communicating with multiple devices via respective non-cellular communication interfaces of the multiple devices using a wide-area network, the multiple devices being located in multiple geographic regions, wherein the multiple devices include respective cellular communication interfaces configured to communicate wirelessly with a cellular communication network;
commanding the multiple devices, via the wide-area network and respective debug interfaces of the multiple devices, to execute an application that relies at least in part on cellular communications through the cellular communication network;
receiving, from the respective debug interfaces of the multiple devices via the wide-area network, data corresponding respectively to the multiple devices, wherein at least part of the data corresponding to a first device of the multiple devices relates to execution of the application by the first device of the multiple devices and is indicative of an operational status of the cellular communication network; and
determining, based at least in part on first historical status data of the data corresponding to the first device and second historical status data of the data corresponding to a second device of the multiple devices, that operation of the cellular communication network is impaired starting in a first region of the multiple geographic regions associated with the first device and moving to a second region of the multiple geographic regions associated with the second device.

2. The method of claim 1, further comprising:
generating an alert to report the operational status of the cellular communication network in at least the first region and the second region based at least in part on the data.

3. The method of claim 1, further comprising reporting that the operation of the cellular communication network is impaired in one of the multiple geographic regions based at least in part on the data.

4. The method of claim 1, wherein the data indicates response times of the application.

5. The method of claim 4, further comprising reporting that the operation of the cellular communication network is impaired in one of the multiple geographic regions based at least in part on one or more of the response times.

6. The method of claim 1, further comprising:
determining, based at least in part on third historical status data of the data corresponding to a third device of the multiple devices, that the operation of the cellular communication network is impaired in the first region based at least in part on comparing the first historical status data relative to the third historical status data; and
reporting relative performance of the cellular communication network in the multiple geographic regions based at least in part on the data.

7. The method of claim 1, wherein the communicating is through wired interfaces of the multiple devices.

8. The method of claim 1, wherein the wide-area network comprises an Internet.

9. The method of claim 1, multiple ones of the multiple devices being located in each of the multiple geographic regions.

10. The method of claim 1, further comprising receiving metadata from the multiple devices, the metadata indicating geographic locations of the multiple devices.

11. The method of claim 1, further comprising:
determining that operation of the cellular communication network is impaired in one of the multiple geographic regions based at least in part on the data; and
providing a notification indicating the one of the geographic regions.

12. The method of claim 1, further comprising:
recording, as recorded data, the data over time for each of the multiple devices; and
detecting a decrease over time in performance of the cellular communication network in one of the multiple geographic regions based at least in part on the recorded data, wherein determining that the operation of the cellular communication network is impaired starting in the first region and moving to the second region is based at least in part on the data over time and the decrease over time in performance.

13. One or more non-transitory computer-readable media storing computer-executable instructions that, when executed by one or more processors, cause the one or more processors to perform actions comprising:
communicating with devices through respective non-cellular communication interfaces of the devices, wherein the devices are configured to communicate wirelessly through a cellular communication network, the devices being located in multiple geographic regions;
commanding the devices, via non-cellular communication through respective debug interfaces of the devices, to execute a consumer application that is available for installation and use on the devices, wherein the consumer application relies at least in part on communications through the cellular communication network;
receiving data from the devices via non-cellular communication through the respective debug interfaces of the devices, wherein at least part of the data indicates a response time of the consumer application, wherein the response time of the consumer application includes a time indicative of communications through the cellular communication network;
recording response times to indicate an operational status of the cellular communication network in the multiple geographic regions; and
determining, based at least in part on first historical response time of the response times corresponding to a first device of the devices and second historical response time of the response times corresponding to a second device of the devices, that operation of the cellular communication network is impaired starting in a first region of the multiple geographic regions associated with the first device.

14. The one or more non-transitory computer-readable media of claim 13, wherein the devices are of one or more models that have been commercially available or will be commercially available to users of the cellular communication network.

15. The one or more non-transitory computer-readable media of claim 13, the actions further comprising receiving metadata from the devices, the metadata indicating geographic locations of the devices.

16. The one or more non-transitory computer-readable media of claim 13, the actions further comprising:
detecting the response time of the consumer application executed by one of the devices that exceeds a threshold; and
generating an alert regarding performance of the cellular communication network in at least one of the multiple geographic regions in which the one of the devices is located.

17. The one or more non-transitory computer-readable media of claim 13, the actions further comprising displaying graphics that indicate performance metrics of the cellular communication network in the multiple geographic regions over time, wherein the performance metrics are based at least in part on the response times.

18. A system, comprising:
one or more processors; and
non-transitory computer-readable media storing computer-executable instructions that, when executed by the one or more processors, cause the one or more processors to perform actions comprising:
communicating with multiple devices through respective wired communication interfaces of the devices, wherein the multiple devices are configured to communicate wirelessly through a cellular communication network, the multiple devices being located in multiple geographic regions;
commanding the multiple devices, through respective debug interfaces of the multiple devices, to execute an application that relies at least in part on communications through the cellular communication network;
receiving data from the multiple devices through the respective wired communication interfaces and the respective debug interfaces of the multiple devices, wherein at least part of the data relates to execution of the application on the multiple devices via communications through the cellular communication network;
evaluating the data to determine an operational status of the cellular communication network in the multiple geographic regions; and
determining, based at least in part on comparing first historical status data of the data corresponding to a first device of the multiple devices relative to second historical status data of the data corresponding to a second device of the multiple devices, that operation of the cellular communication network is impaired in a first region of the multiple geographic regions associated with the first device.

19. The system of claim 18, wherein:
the data indicates a response time of the application; and
evaluating the data comprises comparing the response time to a threshold.

20. The system of claim 18, the actions further comprising:
displaying graphics that indicate performance metrics of the cellular communication network in the multiple geographic regions over time, wherein the performance metrics are based at least in part on the data; and
determining that impairment of the operation of the cellular communication network has traveled from the first region to a second region of the multiple geographic regions associated with the second device.

* * * * *